United States Patent [19]
Reele et al.

[11] Patent Number: 6,049,376
[45] Date of Patent: Apr. 11, 2000

[54] SCANNER, A PROTECTIVE ARRANGEMENT AND A METHOD OF PROTECTING A SCANNING SURFACE OF A SCANNER

[75] Inventors: Samuel Reele; Russell J. Cope, both of Rochester, N.Y.

[73] Assignee: Eastman Kodak Company, Rochester, N.Y.

[21] Appl. No.: 09/152,172

[22] Filed: Sep. 11, 1998

[51] Int. Cl.⁷ ............................ G03B 27/62; G03B 27/52; H04N 1/04
[52] U.S. Cl. ................................. 355/75; 355/40; 358/474
[58] Field of Search ............................. 358/474; 399/124, 399/365, 369, 380; 355/75, 27, 40, 84

[56] References Cited

U.S. PATENT DOCUMENTS

| | | | |
|---|---|---|---|
| 4,078,862 | 3/1978 | Kuwana | 355/75 |
| 4,471,016 | 9/1984 | Scholes . | |
| 4,523,831 | 6/1985 | Yokoo et al. . | |
| 5,070,966 | 12/1991 | Brennan . | |
| 5,492,769 | 2/1996 | Pryor et al. . | |

FOREIGN PATENT DOCUMENTS 58-78140  5/1983  Japan .
58-194055  11/1983  Japan .

*Primary Examiner*—Safet Metjahic
*Assistant Examiner*—Hung Henry Nguyen
*Attorney, Agent, or Firm*—David A. Novais; Nelson Adrian Blish

[57] ABSTRACT

A protective arrangement (20, 30), method and scanner that prevent scratching of a scanning surface (11) of a scanner (15). The protective arrangement can be removably mounted on the scanning surface so as to limit or reduce access area to the scanning surface. Further, the protective arrangement is positioned on the scanning surface in a manner that permits placement of an image to be scanned, such as a document or object, between the scanning surface and the protective arrangement. The protective arrangement can be in the form of bands (20a, 20b) and/or a planar grid structure (30) which can be removably attached to a body of the scanner. The protective arrangement can also define at least one opening that permits manipulation of the image to be scanned to a desired position on the scanning surface, while the image to be scanned is located between the protective arrangement and the scanning surface.

11 Claims, 4 Drawing Sheets

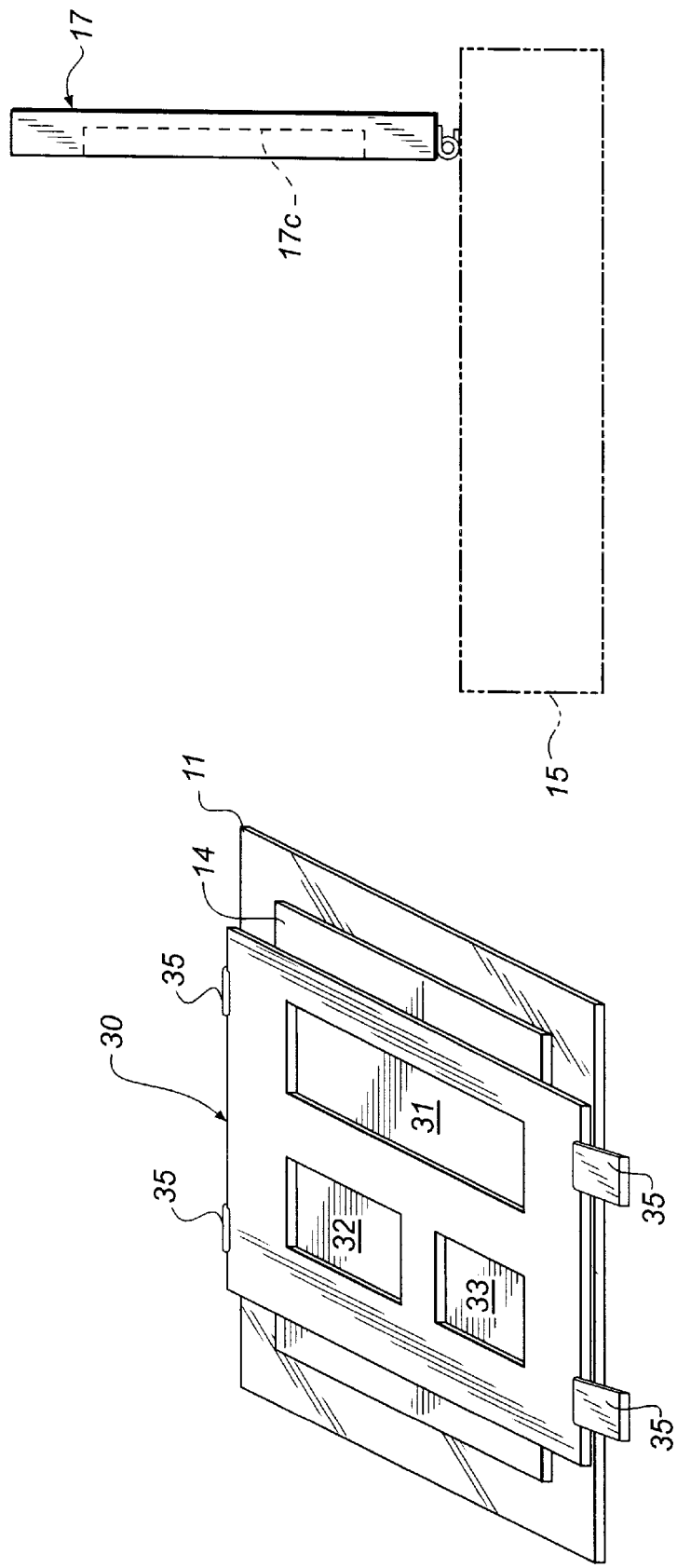

SCANNER, A PROTECTIVE ARRANGEMENT AND A METHOD OF PROTECTING A SCANNING SURFACE OF A SCANNER

FIELD OF THE INVENTION

The present invention relates to image scanners such as flatbed image scanners and in particular, to a scanner, a protective arrangement and a method which prevents the scratching of a scanning surface of the scanner by common sources to which the scanner is subjected to in normal operation and use.

BACKGROUND OF THE INVENTION

Flatbed scanners are designed in such a way that a large sheet of glass (typically 8 ½"×11" or larger), which defines a scanning surface of the scanner, is used to position an image such as a document or object to be scanned, mechanically and optically with respect to a scanning mechanism of the scanner. Since the scanning surface is in the optical path of the image to be scanned, artifacts such as dirt, dust and/or scratches degrade the quality of the image to be scanned. As a result, these artifacts must be controlled and/or removed. Dirt and dust can be easily controlled by way of dust covers, and, any dirt or dust that does end up on the scanning surface can easily be cleaned. On the other hand, scratches caused by, for example, scissors, staplers, knives or other scratch producing objects are permanent and cannot be removed. It is therefore imperative that one try to minimize the generation of scratches on the scanning surface of a scanner.

Some known processes of making glass scratch or abrasion-resistant involve the application of diamond or diamond-like particles to the glass, or the application of an organic coating to the glass, (see, for example, U.S. Pat. Nos. 5,492,769 and 4,471,016). These processes tend to be complicated and costly. Therefore, the concept of scratch resistance coatings on the scanning surface of a scanner can add cost to a price sensitive commodity. Further, these processes do not provide for a surface which can prevent or minimize scratches from diamonds such as on diamond rings. Scratch resistance coatings may also compromise the optical path and, therefore, the quality of the scanned image. Since scanner manufacturers can control scratches during manufacturing, this becomes a quality and cost repair/replacement issue for the end user or product manufacturer. Since scanner usage can typically be quite high, this is usually a re-occurring significant cost. In one application of thermal printers today, this cost can result in approximately 5% of product cost.

FIG. 1 illustrates a typical conventional flatbed scanner 7. Flatbed scanner 7 includes a dust cover 9 and a scanning surface 11 in the form of a glass pane or plate. In normal operation, a user lifts dust cover 9 to expose scanning surface 11. During this time frame, when dust cover 9 is left open, large foreign objects such as scissors, staplers, knives or other scratch producing objects can be placed upon scanning surface 11 and moved around so as to cause scratches on scanning surface 11. Next, an image to be scanned 14 such as a document or object is placed upon scanning surface 11 and aligned. During placement of image to be scanned 14, it is very typical for rings (sometimes with diamonds), metal watches, watch bands, metal cuff links, etc. to rub against scanning surface 11 to cause scratches to occur. It also noted that one can easily access scanning surface 11 directly with ones wrist area where watches, bracelets and chains can exist, and the underside finger area (where diamond rings protrude) when placing image to be scanned 14. Also, nothing prevents bottom side access (when the image to be scanned is between fingers) with the back side of the fingers rubbing across scanning surface 11.

SUMMARY OF THE INVENTION

The present invention provides for a scanner, a protective arrangement, and a method which minimizes the scratching of glass plate scanning surfaces of scanners by foreign objects.

The scanner of the present invention comprises a scanning surface onto which an image to be scanned is placed; and a protective arrangement mounted on the scanning surface. The protective arrangement limits or reduces access area to the scanning surface and is positioned on the scanning surface in a manner that permits a placement of an image to be scanned between the scanning surface and the protective arrangement. The protective arrangement defines at least one opening to permit manipulation of the image to be scanned to a desired position on the scanning surface while the image to be scanned is located between the protective arrangement and the scanning surface.

The present invention also relates to an assembly for protecting a scanning surface of a scanner. The assembly comprises a protective arrangement that is removably attachable to a body of the scanner and extends over the scanning surface. The protective arrangement limits or reduces an access area to the scanning surface and is positioned on the scanning surface in a manner that permits a placement of an image to be scanned between the scanning surface and the protective arrangement. The protective arrangement defines at least one opening to permit manipulation of the image to be scanned to a desired position on the scanning surface while the image to be scanned is located between the scanning surface and the protective arrangement.

The present invention also relates to a method of protecting a scanning surface of a scanner. The method comprises the steps of providing a protective arrangement over the scanning surface so as to limit or reduce access area to the scanning surface and permit placement of an image to be scanned between the scanning surface and the protective arrangement, with the protective arrangement defining at least one opening; and using the at least one opening to manipulate the image to be scanned to a desired position on the scanning surface while the image to be scanned is between the scanning surface and the protective arrangement.

BRIEF DESCRIPTION OF THE DRAWINGS

FIG. 5a is a second embodiment of a scanner incorporating a protective arrangement in accordance with the present invention; and FIG. 5b is a view of a cover which can be used with the embodiment of FIG. 5a.

DETAILED DESCRIPTION OF THE INVENTION

Figure 1:
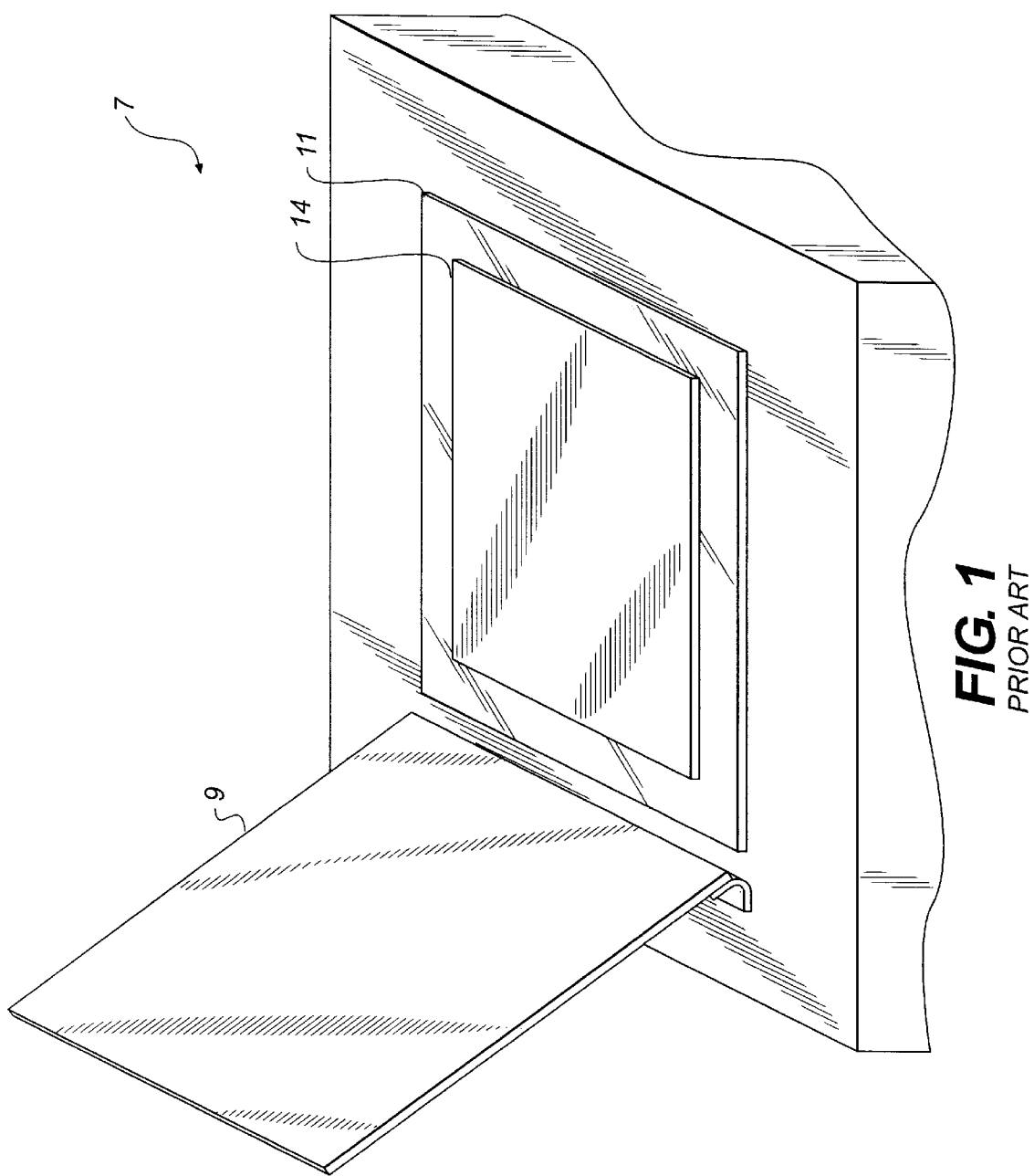
FIG. 1 illustrates a conventional flatbed scanner.
Figure 2:
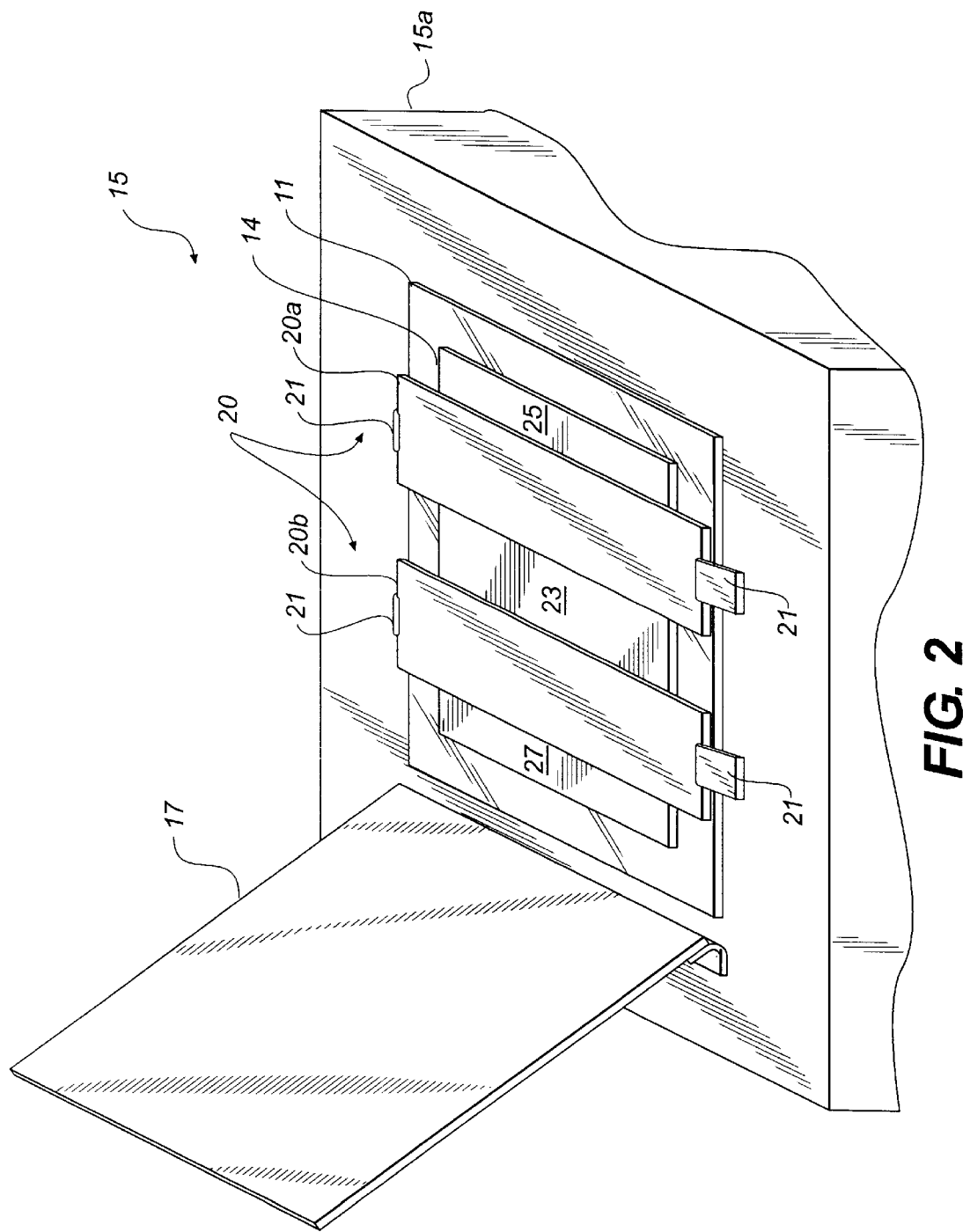
FIG. 2 illustrates a first embodiment of a scanner incorporating a protective arrangement in accordance with the present invention.

Referring now to the drawings, wherein like reference numerals designate identical or corresponding parts throughout the several views, FIG. 2 illustrates an image scanner 15 such as a flatbed scanner. Scanner 15 is designed to minimize scratching during normal use. In accordance with the present invention, scanner 15 can include a dust cover 17 mounted on a body 15a of scanner 15; as well as a scanning surface 11 in the form of a glass pane or plate as discussed above.

FIG. 2 shows a first embodiment of a protective arrangement 20 of the present invention. Protective arrangement 20 comprises first and second bands 20a and 20b which can be made of plastic, rubber, metal or other materials, and placed on scanning surface 11. As illustrated in FIG. 2, bands 20a, 20b are placed on and extend across scanning surface 11, so as to limit or reduce access area to scanning surface 11. Bands 20a, 20b can be removably held onto body 15a of scanner 15 by way of holders or straps 21, or any other holding means such as hooks, clips, etc., which permit the removable attachment of bands 20a, 20b onto body 15a, and subsequently over scanning surface 11. That is, straps 21 can be designed to permit bands 20a, 20b to be snapped into place, yet easily removed for, i.e., cleaning purposes.

Figure 4:
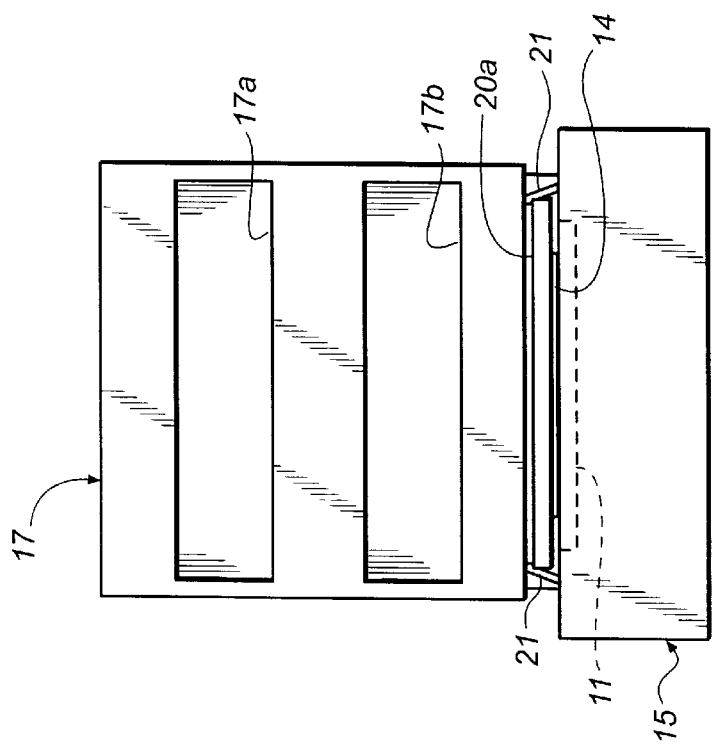
FIG. 4 is a front view of the scanner of FIG. 2.
Figure 3:
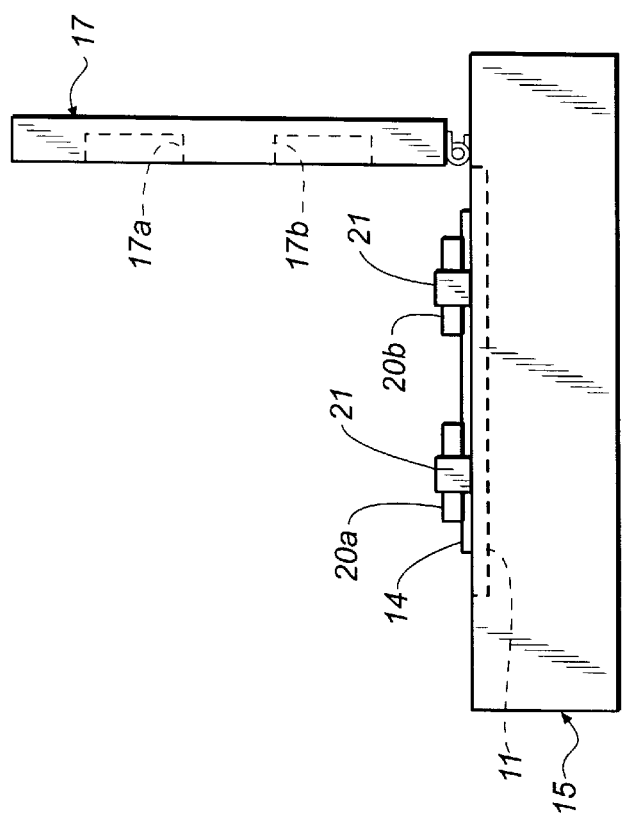
FIG. 3 is a side view of the scanner illustrated in FIG. 2.

In the side and front views of scanner 15 as respectively illustrated in FIGS. 3 and 4, the structure of the dust cover 17 can be more easily seen. As illustrated in FIG. 3, dust cover 17 can include recessed areas 17a, 17b which respectively correspond to the positions of bands 20a, 20b on scanning surface 11. Therefore, when dust cover 17 is moved from an open position as illustrated in FIG. 3 in which scanning surface 11 is exposed, to a closed position in which dust cover 17 covers scanning surface 11, bands 20a, 20b will be respectively fitted within recessed areas 17a, 17b to provide for a compact arrangement.

The use of scanner 15 will now be described. Under normal operation, a user lifts dust cover 17 as illustrated in FIGS. 2–4 to expose scanning surface 11. During this time frame (or if cover 17 is left open), the placing of large foreign object such as scissors, staplers, knives or other scratch producing objects is deterred since bands 20a, 20b limit or reduce access area to large flat areas of scanning surface 11. That is, as illustrated in FIG. 2, through the use of bands 20a, 20b, the only areas of exposed glass of scanning surface 11 are areas 23, 25 and 27. Thereafter, image to be scanned 14 is placed upon scanning surface 11 by sliding image to be scanned 14 between bands 20a, 20b and glass plate scanning surface 11. It is noted that the arrangement of the present invention is not limited to the utilization of two bands 20a, 20b as shown, and that the number of bands and/or size or geometry of the bands utilized is based on design considerations. Also, although four straps 21 are shown, it is recognized that the present invention is not limited to the number of straps 21 shown, and that any number of straps 21 which can removably maintain bands 20a, 20b on body 15a of scanner 15 can be utilized.

Due to the ergonomics required by the utilization of bands 20a, 20b, a user must slide image to be scanned 14 under one of bands 20a, 20b and use his/her fingers to continue to move image to be scanned 14 under the other of bands 20a, 20b. Manipulation and movement of image to be scanned 14 can be done by access to areas 23, 25, and 27. Final alignment of image to be scanned 14 can be accomplished by placing ones fingers on the back of image to be scanned 14 through access areas 23, 25, 27, and with slight pressure slide image to be scanned 14 while image to be scanned 14 is positioned between bands 20a, 20b and scanning surface 11. In all instances, the fingers of the individual are utilized, and the fingers are always on top of the back side of image to be scanned 14 as opposed to on scanning surface 11. At no time are the fingers, wrist areas, etc. of a user allowed to come in direct contact with scanning surface 11. Those areas (which can contain scratch producing objects) will only come in contact with the bands 20a, 20b or the back side of image to be scanned 14. As a result, during placement of image to be scanned 14, bands 20a, 20b limit or reduce access area to scanning surface 11 to minimize contact between metal watches, watch bands, metal cuff links, etc. and scanning surface 11. This minimizes the occurrence of scratches on scanning surface 11.

FIG. 5a illustrates a second embodiment of a protective arrangement of the present invention. As illustrated in FIG. 5a, a protective arrangement 30 can be in the form of a planar or grid structure having "n" defined openings or access areas 31, 32, 33 (wherein "n"≧1). Protective arrangement 30 can be made of plastic, rubber, metal or other materials. It is noted that openings 31, 32, 33 can have any shape or form and depending on design considerations can be positioned at various positions within protective arrangement 30. It is also noted that although three openings 31, 32, 33 are shown, any number of openings can be utilized. It is further recognized that a combination of bands as illustrated in FIGS. 2–4 and a planar or grid structure as illustrated in FIG. 5a can be utilized within the context of the present invention.

The combination of protective arrangement 30 and openings 31, 32, 33 results in the use of fingers only to position image to be scanned 14 at defined reference origins. This also reduces the possibility of the user contacting scanning surface 11 with his/her wrist and/or fingers while positioning image to be scanned 14. Like the embodiment illustrated in FIGS. 2–4, protective arrangement 30 can be removably attached to body 15a of scanner 15 by way of a holder 35 such as straps, belts, etc. Although four holders 35 are shown, it is recognized that the present invention is not limited to the number of holders 35 shown, and that any number of holders 35 which removably maintain protective arrangement 30 on the scanner as shown can be utilized.

The embodiment of FIG. 5a can be used in the same way as the embodiment of FIG. 2 in that a user slides image to be scanned 14 between protective arrangement 30 and scanning surface 11, and manipulates and/or aligns image to be scanned 14 into position by utilizing openings 31, 32 and 33. Also as illustrated in FIG. 5a, protective arrangement 30 limits or reduces access area to scanning surface 11 to therefore limit exposure of scanning surface 11 to large objects which can produce scratches. Additionally, with the embodiment of FIG. 5a, dust cover 17 would have a recessed area 17c (FIG. 5b), which is sized so as to permit protective arrangement 30 to be fitted therein when dust cover 17 is moved to a closed position.

Therefore, the present invention provides for a protective arrangement which can be removably positioned on a scanning surface of a scanner, and can be positioned in such a way so as to limit or reduce access area to the scanning surface. With the protective arrangement of the present invention, a user utilizes his/her finger tips to position an image and/or object to be scanned, therefore, illiminating or minimizing finger, wrist and arm contact with a glass scanning surface of the scanner.

The invention has been described in detail with particular reference to certain preferred embodiments thereof, but it will be understood that variations and modifications can be effected within the spirit and scope of the invention.

What is claimed is:

1. A scanner comprising:

a scanning surface onto which an image to be scanned is placed;

a protective arrangement mounted on said scanning surface, said protective arrangement limiting access to said scanning surface and being positioned on said scanning surface in a manner which permits placement of said image to be scanned between said scanning surface and said protective arrangement, said protective arrangement defining at least one area open to said image to be scanned to permit manipulation of said image to be scanned through said protective arrangement, to a desired position on said scanning surface while said image to be scanned is located between said protective arrangement and said scanning surface;

wherein said protective arrangement comprises at least a first band and a second band spaced from said first band which extend along said scanning surface, said at least one area being defined between said first band and said second band; and wherein a first end of said first band is attached to a first side of said scanning surface and a second end of said first band is attached to a second side of said scanning surface, wherein a first end of said second band is attached to said first side of said scanning surface and a second end of said second band is attached to said second side of said scanning surface.

2. A scanner according to claim 1, wherein each of said first and second bands are removably attached to said scanner.

3. A scanner according to claim 1, wherein each of said first and second bands is made of a plastic, rubber or metal material.

4. A scanner comprising:

a scanning surface onto which an image to be scanned is placed;

a protective arrangement mounted on said scanning surface, said protective arrangement limiting access to said scanning surface and being positioned on said scanning surface in a manner which permits placement of said image to be scanned between said scanning surface and said protective arrangement, said protective arrangement defining at least one area open to said image to be scanned to permit manipulation of said image to be scanned through said protective arrangement, to a desired position on said scanning surface while said image to be scanned is located between said protective arrangement and said scanning surface;

further comprising a cover mounted on a body of said scanner and movable between at least a closed position in which said scanning surface is covered by said cover and an open position in which said scanning surface is exposed;

wherein said protective arrangement comprises at least a first band and a second band spaced from said first band which extend along said scanning surface, said at least one area being defined between said first band and said second band; and wherein a first end of said first band is attached to a first side of said scanning surface and a second end of said first band is attached to a second side of said scanning surface, wherein a first end of said second band is attached to said first side of said scanning surface and a second end of said second band is attached to said second side of said scanning surface.

5. A scanner according to claim 4, wherein said cover is a dust cover and comprises recessed areas which correspond to said first and second bands, such that in said closed position of said cover each of said first and second bands is fitted in a corresponding recessed area of said cover.

6. A scanner comprising:

a scanning surface onto which an image to be scanned is placed;

a protective arrangement mounted on said scanning surface, said protective arrangement limiting access to said scanning surface and being positioned on said scanning surface in a manner which permits placement of said image to be scanned between said scanning surface and said protective arrangement, said protective arrangement defining at least one area open to said image to be scanned to permit manipulation of said image to be scanned through said protective arrangement, to a desired position on said scanning surface while said image to be scanned is located between said protective arrangement and said scanning surface;

further comprising a cover mounted on a body of said scanner and movable between at least a closed position in which said scanning surface is covered by said cover and an open position in which said scanning surface is exposed;

wherein said protective arrangement comprises at least a first band and a second band spaced from said first band which extend along said scanning surface, said at least one area being defined between said first band and said second band; and wherein said cover defines a recessed area into which said planar structure is fitted when said cover is in said closed position.

7. An assembly for protecting a scanning surface of a scanner, said assembly comprising:

a protective arrangement which is removably attachable to a body of said scanner and extends over said scanning surface, said protective arrangement limiting access to said scanning surface and being positioned on said scanning surface in a manner which permits placement of an image to be scanned between said scanning surface and said protective arrangement, said protective arrangement comprising at least one area open to said image to be scanned to permit manipulation of said image to be scanned to a desired position on said scanning surface while said image to be scanned is located between said scanning surface and said protective arrangement;

wherein said protective arrangement comprises at least a first band and a second band spaced from said first band which extend along said scanning surface, said at least one area being defined between said first band and said second band; and wherein a first end of said first band is attached to a first side of said scanning surface and a second end of said first band is attached to a second side of said scanning surface, wherein a first end of said second band is attached to said first side of said scanning surface and a second end of said second band is attached to said second side of said scanning surface.

8. An assembly according to claim 7, wherein each of said first band and said second band is made of a plastic, rubber or metal material.

9. A method of protecting a scanning surface of a scanner, the method comprising the steps of:

providing a protective arrangement over said scanning surface so as to limit access to said scanning surface and permit placement of an image to be scanned between said scanning surface and said protective arrangement, said protective arrangement comprising at least one area open to said image to be scanned;

using said at least one area to manipulate said image to be scanned to a desired position on said scanning surface while said image to be scanned is between said scanning surface and said protective arrangement;

wherein said protective arrangement comprises at least a first band and a second band spaced from said first band which extend across said scanning surface, said at least one area being defined between said first band and said second band; and wherein a first end of said first band is attached to a first side of said scanning surface and a second end of said first band is attached to a second side of said scanning surface, wherein a first end of said second band is attached to said first side of said scanning surface and a second end of said second band is attached to said second side of said scanning surface.

10. A scanner comprising:

a scanning surface onto which an image to be scanned is placed;

a protective arrangement mounted on said scanning surface, said protective arrangement limiting access to said scanning surface and being positioned on said scanning surface in a manner which permits placement of said image to be scanned between said scanning surface and said protective arrangement, said protective arrangement defining at least one area open to said image to be scanned to permit manipulation of said image to be scanned through said protective arrangement, to a desired position on said scanning surface while said image to be scanned is located between said protective arrangement and said scanning surface;

a cover mounted on a body of said scanner and movable between at least a closed position in which said scanning surface is covered by said cover and an open position in which said scanning surface is exposed;

wherein said protective arrangement comprises at least a first band and a second band spaced from said first band which extend along said scanning surface, said at least one area being defined between said first band and said second band;

wherein a first end of said first band is attached to a first side of said scanning surface and a second end of said first band is attached to a second side of said scanning surface, wherein a first end of said second band is attached to said first side of said scanning surface and a second end of said second band is attached to said second side of said scanning surface; and wherein said cover is a dust cover and comprises recessed areas which correspond to said first and second bands, such that in said closed position of said cover each of said first and second bands is fitted in a corresponding recessed area of said cover.

11. A scanner comprising:

a scanning surface onto which an image to be scanned is placed;

a protective arrangement mounted on said scanning surface, said protective arrangement limiting access to said scanning surface and being positioned on said scanning surface in a manner which permits placement of said image to be scanned between said scanning surface and said protective arrangement, said protective arrangement defining at least one area open to said image to be scanned to permit manipulation of said image to be scanned through said protective arrangement, to a desired position on said scanning surface while said image to be scanned is located between said protective arrangement and said scanning surface;

a cover mounted on a body of said scanner and movable between at least a closed position in which said scanning surface is covered by said cover and an open position in which said scanning surface is exposed;

wherein said protective arrangement defines a planar structure which extends over said scanning surface, said at least one area being defined within said planar structure; and wherein said cover defines a recessed area into which said planar structure is fitted when said cover is in said closed position.

* * * * *